(12) United States Patent
Stratton et al.

(10) Patent No.: US 8,475,581 B2
(45) Date of Patent: Jul. 2, 2013

(54) DE-POLLUTING AND SELF-CLEANING EPOXY SILOXANE COATING

(75) Inventors: John Stratton, Cleethorpes (GB); Graham Goodwin, Cleethorpes (GB)

(73) Assignee: Cristal USA Inc., Hunt Valley, MD (US)

( * ) Notice: Subject to any disclaimer, the term of this patent is extended or adjusted under 35 U.S.C. 154(b) by 0 days.

(21) Appl. No.: 13/034,280

(22) Filed: Feb. 24, 2011

(65) Prior Publication Data

US 2011/0144225 A1 Jun. 16, 2011

Related U.S. Application Data

(63) Continuation of application No. 12/116,070, filed on May 6, 2008, now abandoned.

(51) Int. Cl.
| | |
|---|---|
| *D06M 15/643* | (2006.01) |
| *C04B 41/49* | (2006.01) |
| *C07F 7/18* | (2006.01) |
| *C03C 25/24* | (2006.01) |
| *C09C 1/36* | (2006.01) |

(52) U.S. Cl.
USPC . 106/436; 106/444; 106/287.11; 106/287.12; 106/287.13; 106/287.15

(58) Field of Classification Search
USPC ........... 106/436, 444, 287.11–287.13, 287.15
See application file for complete search history.

(56) References Cited

U.S. PATENT DOCUMENTS

| | | | | |
|---|---|---|---|---|
| 5,755,867 | A * | 5/1998 | Chikuni et al. | 106/287.16 |
| 6,048,910 | A * | 4/2000 | Furuya et al. | 522/86 |
| 6,191,062 | B1 * | 2/2001 | Hayakawa et al. | 502/159 |
| 6,197,101 | B1 * | 3/2001 | Matsumura et al. | 106/287.11 |
| 6,383,980 | B1 * | 5/2002 | Hagihara et al. | 502/340 |
| 6,407,033 | B1 * | 6/2002 | Kimura et al. | 502/350 |
| 7,572,486 | B2 * | 8/2009 | Takahashi et al. | 427/384 |
| 7,572,846 | B2 | 8/2009 | Engelbrecht et al. | |
| 7,611,782 | B2 * | 11/2009 | Furuzono et al. | 428/701 |
| 7,736,735 | B2 * | 6/2010 | Kanamori et al. | 428/337 |
| 2002/0007006 | A1 | 1/2002 | Kanamori et al. | |
| 2007/0213459 | A1 | 9/2007 | Tamai et al. | |
| 2009/0042042 | A1 * | 2/2009 | Yuki et al. | 428/447 |

FOREIGN PATENT DOCUMENTS

| | | |
|---|---|---|
| EP | 0913447 | 2/2006 |
| EP | 09743490 | 5/2012 |
| WO | WO2009/137504 | 12/2009 |
| WO | PCT/US2009/042879 | 7/2011 |

OTHER PUBLICATIONS

XP-002675547; Thomson Scientific; London, GB; Sep. 26, 2001; abstract of JP2001 262063.
XP-002675546; Thomson Scientific; London, GB; Jan. 10, 2008; abstract for KR2008 004723.
Textor, et al.; Thin Coatings with Photo-catalytic Activity Based on Inorganic-Organic Hybrid Polymers Modified with Anatase Nanoparticles;Macromolecular Symposia, vo. 254; No. 1; Aug. 1, 2007; pp. 196-202.

* cited by examiner

*Primary Examiner* — Patricia L Hailey
(74) *Attorney, Agent, or Firm* — Dunlap Codding, P.C.

(57) ABSTRACT

De-polluting, self-cleaning coating compositions are disclosed which comprise photocatalytic titanium dioxide and a binder comprising an epoxy siloxane polymer. The compositions produce durable, self-cleaning coatings with photocatalytic activity against pollutants in the air, such as $NO_x$ compounds.

20 Claims, 10 Drawing Sheets

DE-POLLUTING AND SELF-CLEANING EPOXY SILOXANE COATING

CROSS-REFERENCE TO RELATED APPLICATIONS

The present application is a continuation of U.S. Ser. No. 12/116,070 filed May 6, 2008, now abandoned which is hereby expressly incorporated by reference in it's entirety.

FIELD OF INVENTION

The present invention relates to photocatalytic coatings on a substrate and to compositions for imparting the coating on a surface of the substrate. More specifically, the invention relates to de-polluting, self-cleaning coatings and coating compositions comprising titanium dioxide particles and epoxy siloxane.

BACKGROUND OF THE INVENTION

The photocatalytic properties of titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade $NO_x$ and volatile organic compounds (VOCs) in the air. In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

Coatings containing photocatalytic titanium dioxide can be made using many different types of binders or resins systems. Typically, photocatalytic coatings are prepared with polysiloxane binders because of the excellent stability of polysiloxane polymers to oxidative conditions. Binders and resins systems composed of carbon, hydrogen, and oxygen rapidly undergo photooxidation to produce water, carbon dioxide and, if nitrogen is present, nitrogen-containing species in the presence of UV light.

Although coating compositions comprising siloxane type polymers show excellent durability, the cost of siloxane type polymers is significantly higher than the cost of other organic polymers such as acrylic or styrene polymers. Using mixtures of siloxane polymers with organic polymers in coating compositions improves the durability of the corresponding coatings over organic polymer based compositions alone, but still results in progressively diminished durability as the siloxane polymer concentration is reduced. Accordingly, it has also been difficult to provide coatings having high levels of photocatalyst because the catalyst tends to oxidize and break down the polymeric binder of the coating. This problem is exacerbated when the coating is exposed to intense UV radiation from direct sunlight, as is the case with an exterior paint.

Topcoat coatings based on epoxy siloxane polymers are well known and provide coatings with the excellent corrosion resistance of an epoxy coating with the weatherability of a polyurethane in one coating. Since the epoxy siloxane polymer is produced from the reaction of an epoxy resin and a cross-linking component, they are typically a two component system that must be combined prior to application of the coating. These types of coatings find wide use in marine and industrial settings where durability and resistance to corrosion is critical. For example, epoxy siloxane based coatings are used on structural steel, tank exteriors, and piping and the like. Furthermore, epoxy siloxane coatings do not contain isocyanate residues, which present a safety hazard to personnel applying the coating. Use of epoxy siloxanes in combination with inorganic zinc silicate primers allow the use of a single coat of an epoxy siloxane coating rather than one coat of an epoxy-based coating and another coat of a urethane coating. The ability to provide a high quality coating in one coat, presents a significant labor cost savings and minimizes down time of equipment.

It is therefore an object of the present invention to provide durable photocatalytic coatings on substrates and coating compositions for applying said coatings. In particular, paint coatings and coating compositions, which comprise titanium dioxide photocatalysts capable of removing pollutants from the air and self-cleaning are provided. It is a particular object of the invention to provide durable coatings comprising photocatalytic titanium dioxide and an epoxy siloxane binder capable of removing pollutants from the air and self-cleaning.

International Application Publications Nos. WO2005/083014, WO 2006/030250, and WO 2005/083013 to Goodwin et al., all of which are hereby incorporated by reference in their entirety, describe self-cleaning and de-polluting coating compositions comprising photocatalytic $TiO_2$.

U.S. Pat. No. 4,250,074 to Foscante et al., which is hereby incorporated by reference in its entirety, describes coatings that comprise an interpenetrating polymer network of a polymerized epoxy resin intertwined with a polysiloxane polymer. The epoxy resin is cured with an amine curing agent or with an aminosilane.

U.S. Pat. Nos. 5,618,860 and 5,804,616 to Mowrer et al., which are hereby incorporated by reference in their entirety, describe an epoxysiloxane based coating composition. The composition is prepared by combining a blend of an aromatic epoxy resin with a polysiloxane and an organooxysilane, an amine or aminosilane hardener, a catalyst and an aggregate or pigment component.

U.S. Pat. No. 7,026,398 to Monkiewicz et al., which is hereby incorporated by reference in its entirety, describes an air-drying coating composition that comprises at least one epoxy resin, at least one acrylic resin, at least one acrylic monomer, at least one copolymer based on an acrylic monomer or epoxy monomer, optionally a silicic ester and or alkyl silicate, at least one aminoalkylsilane and optionally an organosilane or mixture of organosilanes.

U.S. Pat. No. 7,160,962, which is hereby incorporated by reference in its entirety, to Sakugawa describes elastomer-modified epoxy polysiloxane compositions. The compositions are prepared by combining a silicone intermediate with an epoxy resin, an elastomeric resinous intermediate, a polyfunctional amine and optionally a catalyst, pigments and other processing agents.

The foregoing discussion is presented solely to provide a better understanding of the nature of the problems confronting the art and should not be construed in any way as an admission as to prior art nor should the citation of any reference herein be construed as an admission that such reference constitutes "prior art" to the instant application.

SUMMARY OF THE INVENTION

Provided are self-cleaning photocatalytic coatings and coating compositions that comprise photocatalytic titanium dioxide and a binder that comprises an epoxy-functional silicon compound and an amino-functional compound. The compositions provide durable photocatalytic coatings upon application to a substrate that effectively degrade $NO_x$ compounds in the environment when exposed to light. The coating compositions may also comprise one or more pigments, such as pigmentary titanium dioxide and the like, and one or more alkaline extenders. It has been surprisingly been found that coating compositions comprising photocatalytic $TiO_2$ and an epoxy siloxane binder with a total pigment volume concentration of less than about 50% provide durable coatings that effectively remove $NO_x$ compounds from the environment. In one embodiment, the total pigment volume concentration of the coating compositions is between about 5% to about 70% by volume of the dry coating (PVC).

In one embodiment, the amino-functional compound is an amino-functional silicon compound such as amino silanes and the like.

In another embodiment, the epoxy-functional silicon compound is an epoxy siloxane polymer. In another embodiment, the epoxy-functional silicon compound is an epoxy silane. In some embodiments, the composition comprises epoxy-functional silicon compounds that comprise one or more terminal epoxy groups. The composition may also further comprise a polysiloxane polymer or a silane compound.

In some embodiments, the composition comprises a titanium dioxide pigment in addition to the photocatalytic titanium dioxide. Typically, the photocatalytic titanium dioxide is in the anatase crystalline form. In one embodiment, the photocatalytic titanium dioxide is greater than about 95% in the anatase crystalline form.

In some embodiments, the total pigment volume concentration of the compositions is about 10% to about 50% by volume of the dry coating (PVC). In other embodiments, the total pigment volume concentration is about 10% to about 40%, about 15% to about 35%, about 15% to about 30% or about 20% to about 35%. In another embodiment, the total pigment volume concentration is about 20% to about 30% by volume.

In one embodiment, the coating composition comprises about 1% to about 10% photocatalytic titanium dioxide by volume (PVC). In other embodiments, the composition comprises about 1% to about 5% or about 1% to about 3% photocatalytic titanium dioxide by volume.

In one particular embodiment, the coating composition comprises about 1% to about 5% photocatalytic titanium dioxide and has a total pigment volume of the composition of about 10% to about 40% PVC.

In another embodiment, the composition comprises about 1% to about 5% photocatalytic titanium dioxide (PVC) and has a total pigment volume of the composition of about 20% to about 35% PVC.

In various embodiments, the extender in the compositions is calcium carbonate. However, it would be apparent to one of skill in the art that alternate extenders or mixtures of extenders are also useful in the inventive coating compositions.

These and other aspects of the present invention will be better understood by reference to the following detailed description and accompanying figures.

DETAILED DESCRIPTION

Figure 1:
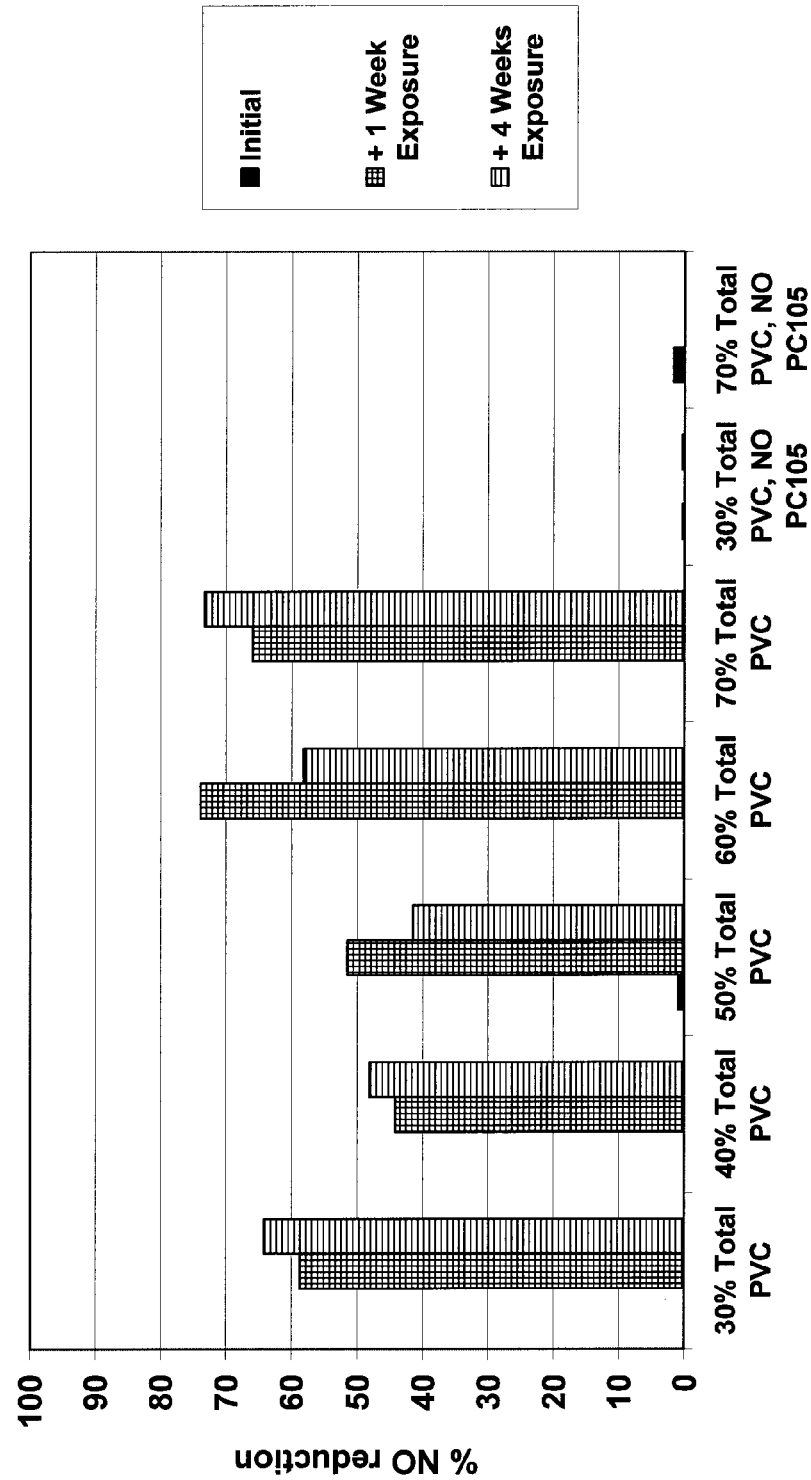
FIG. 1 shows the NO-removing ability of coatings comprising an epoxy siloxane binder with total pigment volume concentrations from 30% to 70% with 7.5% photocatalyst.

The present invention provides a de-polluting and self-cleaning coatings and coating composition that comprise photocatalytic titanium dioxide and an epoxy-functional siloxane binder. The coating compositions produce coatings when applied to a substrate that exhibit excellent durability while exhibiting excellent gloss and opacity and the ability to remove $NO_x$ from the environment and neutralize acidic by-products from the photocatalytic oxidation of $NO_x$ substances. The inventive compositions also typically comprise pigments such as pigmentary grade $TiO_2$ and extenders, such as calcium carbonate.

DEFINITIONS

All terms used herein are intended to have their ordinary meaning unless otherwise provided.

All references to "% by weight" herein relate to the weight % of the total coating composition, including solvent, rather than the dried paint, unless otherwise specified.

As used herein the term "% by volume" or "pigment volume concentration" (PVC) refers to the volume % of the dry paint or coating, unless otherwise specified. The components of the dry paint or coating used to calculate the "% by volume" value include the photocatalytic $TiO_2$, pigment, extender and polymer.

The term "$NO_x$" refers to the species NO (nitrogen oxide) and $NO_2$ (nitrogen dioxide), either collectively or individually.

The term "extender" is intended to have its customary meaning in the art. As used herein, the term "extender" refers to an inorganic material or mixture of inorganic materials which have refractive indices similar to the medium of the coating so that they are usually transparent in the coating medium below the critical pigment volume concentration but have significant opacity (although lower than $TiO_2$) above the critical pigment volume concentration. The extender materials are typically lower in cost than the pigments, including $TiO_2$, and allow for the replacement of some of the pigment in certain situations.

The term "critical pigment volume concentration" (CPVC) is intended to have its customary meaning in the art, such as the point at which there is just sufficient polymer to wet the pigment particles or provide a continuum of pigment particles and polymer. Below the CPVC there is sufficient polymer for pigment wetting and above the CPVC there is not.

The term "aliphatic" is intended to have its customary meaning in the art, and includes without limitation straight-chain, branched or cyclic hydrocarbons which are completely saturated or which contain one or more units of unsaturation but which are not aromatic. Non limiting examples of aliphatic groups include substituted or unsubstituted linear, branched or cyclic alkyl, alkenyl and alkynyl groups and hybrids thereof such as (cycloalkyl)alkyl, (cycloalkenyl)alkyl or (cycloalkyl)alkenyl.

The term "alkyl" is intended to have its customary meaning, and includes straight, branched, or cyclic, primary, secondary, or tertiary hydrocarbon.

The term "aryl" is intended to have its customary meaning in the art, and includes any stable monocyclic, bicyclic, or tricyclic carbon ring(s), wherein at least one ring is aromatic as defined by the Huckel 4n+2 rule, and includes phenyl, biphenyl, or naphthyl.

The term "heteroaryl" is intended to have its customary meaning, and includes an aromatic ring that includes at least one sulfur, oxygen, nitrogen or phosphorus atom in the aromatic ring.

The term "aralkyl," unless otherwise specified, refers to an aryl group as defined above linked to the molecule through an alkyl group as defined above.

The term "alkaryl," unless otherwise specified, refers to an alkyl group as defined above linked to the molecule through an aryl group as defined above.

The term "polysiloxane" is intended to have its standard meaning in the art and includes a polymeric constituent comprising a plurality of diorganosiloxane units.

The term "epoxy-functional compound" as used herein is intended to encompass any compound that has at least one epoxy group, typically two or more epoxy groups, including epoxy-functional silicon compounds as well as epoxy-functional compounds of non-silicon origin as those conventionally utilized in epoxy paint compositions.

The term "amino-functional compound" as used herein is intended to encompass any compound that has at least one amino group capable of reacting with an epoxy group to form a ring-opened product, including amino-functional silicon compound(s) as well as amino-functional compounds of non-silicon origin such as organic and inorganic amino compounds.

The term "epoxy-functional silicon compound" as used herein is intended to mean a silicon compound, such as a silane, siloxane or polysiloxane compound, having at least one epoxy group. Illustrative examples of epoxy-functional silicon compounds are epoxy-functional polysiloxanes and epoxysilanes.

The term "epoxy-functional polysiloxane" as used herein is intended to have its customary meaning in the art, and includes a linear or branched polymeric constituent having one or more polysiloxane chains and having at least one epoxy functional group, including two or more epoxy groups.

The term "epoxy-functional siloxane" as used herein is intended to have its customary meaning in the art, and includes a linear or branched constituent having one or more siloxane chains and having at least one epoxy functional group, including two or more epoxy groups.

Unless indicated otherwise, reference to percentage of a specific component in the inventive coating compositions or the inventive coatings refers to a percentage of the component in the dried coating by volume (PVC). It will be appreciated that the components of the dried coating that are factored in the percentage calculation are the photocatalytic $TiO_2$, any pigments or extenders and the polymeric binder, excluding solvents and other components.

Topcoat coatings based on epoxy siloxane polymers are well known and provide coatings with the excellent corrosion resistance of epoxy coatings with the weatherability of a polyurethane in one coating. Epoxy siloxane binder systems are typically organic solvent based and diluted with various organic solvents including aromatic and non-aromatic solvents, such as alkyl acetates and the like. The crosslinked epoxy siloxane polymer is produced from the reaction of an epoxy-functional silicon compound and a cross-linking component. Therefore, epoxy siloxane binders are typically a two component system that must be combined prior to application of the coating. A significant benefit of using epoxy siloxane based coatings is the cost savings realized from applying one coat rather than two separate coats of an epoxy-based coating and a polyurethane-based coatings.

Coating compositions that comprise solvent-based epoxy siloxane binders are typically produced with a pigment volume concentration (PVC) of between about 15% to about 20%, to produce coatings with good gloss and opacity. However, it was believed that this level of PVC in a coating composition would not be suitable for photoactive depolluting compositions comprising photocatalytic $TiO_2$, because of the high level of binder, which would completely cover the photocatalytic $TiO_2$ particles. In contrast, the PVC in photocatalytic coating compositions comprising $TiO_2$ is typically greater than 50% to provide sufficient photocatalytic activity. It has now been surprisingly discovered that compositions comprising photocatalytic $TiO_2$ and an epoxy siloxane binder with a PVC of 15% to 40% provide photocatalytic coatings with excellent gloss and opacity that exhibit excellent durability and photocatalytic activity.

The compositions of the invention comprise (i) photocatalytic titanium dioxide and (ii) an epoxy siloxane binder. The compositions will typically also comprise one or more pigments or "opacifying agents", such as pigmentary grade titanium dioxide, and one or more extenders. The photocatalytic coating compositions may also include thickotropes, dispersants, and stabilizing agents as well as other components used in coating compositions known to those skilled in the art. In some embodiments, one or more additional binders may be included in the coating compositions.

Any form of titanium dioxide may be used in the coating compositions of the invention, including the rutile or anatase form. Furthermore, mixtures of rutile and anatase titanium dioxide may be used. The photocatalytic coating compositions of the invention comprise particles of photocatalytic titanium dioxide ($TiO_2$) which are capable of forming electron-hole pairs in the presence of electromagnetic radiation, particularly ultraviolet (UV), near-UV, and/or visible light. Preferably, the photocatalytic titanium dioxide is capable of substantial photoactivity in the presence of visible light.

The photocatalytic titanium dioxide particles for use in the coating compositions are preferably predominantly in the anatase crystalline form because of its higher photoactivity than the rutile form. "Predominantly" means that the level of anatase in the titanium dioxide particles of the paint is greater than 50% by weight, although it is preferred that the level of anatase is greater than about 80%, and more preferably greater than about 90% or greater than about 95%. In some embodiments, the photocatalytic titanium dioxide particles of the compositions will be in substantially pure anatase form, meaning that the content of the rutile crystalline form is less than about 5%, more particularly, less than about 2.5%, and more preferred still, less than about 1% by weight. In some embodiments, the photocatalytic titanium dioxide particles will be free of the rutile form, meaning that the rutile crystal form is not detectable by crystallography. Put another way, the photocatalytic titanium dioxide particles may comprise 100% anatase form. The degree of crystallization and the nature of the crystalline phase are measured by X-ray diffraction. In other embodiments, photocatalytic rutile titanium dioxide may be employed as the sole source of photocatalyst, or in combination with anatase photocatalytic titanium dioxide.

The photocatalytic titanium dioxide particles for use in the coating composition will typically have an average particle size which enables the particles to absorb and scatter ultraviolet light. As the particle sizes become very small, the band gap between the valence and conduction bands decreases. Thus, with sufficiently small particle sizes, it has been observed that titanium dioxide particles are capable of absorbing light in the visible spectrum. The titanium dioxide particles for inclusion in the inventive paints will typically have a particle size between about 1 nm and about 150 nm. In some embodiments, the particle size of the photocatalytic titanium dioxide particles will be between about 5 nm and about 20 nm, 25 nm, 30 nm or 40 nm. In a preferred embodiment, the particle size of the titanium dioxide in the paint will be between about 5 nm and about 15 nm, and more preferably between about 5 and about 10 nm. Reference herein to the size of titanium dioxide particles (or crystallites) will be understood to mean the average particle size of the titanium dioxide particulates. Where the particle size is modified by the term "about," it will be understood to embrace somewhat larger or smaller particles sizes than the indicated value to account for experimental errors inherent in the measurement and variability between different methodologies for measuring particle size, as will be apparent to one skilled in the art. The diameters may be measured by, for example, transmission electron microscopy (TEM) and also X-ray diffraction (XRD).

Alternatively, the particles may be characterized by surface area. Typically, the powdered titanium dioxide photocatalyst will have a surface area, as measured by any suitable method, including 5-point BET, of greater than about 20 $m^2/g$. More typically, the photocatalytic titanium dioxide particles have surface areas of greater than about 50 $m^2/g$ or greater than about 70 $m^2/g$. In more preferred embodiments, the titanium dioxide particles have surface areas greater than about 100 $m^2/g$, and preferably greater than about 150 $m^2/g$. In some embodiments, the titanium dioxide photocatalyst will have a surface area greater than about 200 $m^2/g$, greater than about 250 $m^2/g$, or even greater than about 300 $m^2/g$.

Photocatalytic titanium dioxide available from Millennium Inorganic Chemicals under the designations PC50, PC105, PCS300, SP 300N and PC500 have been found to be particularly useful for inclusion in coating compositions according to the invention. PCS300 and SP300N are 100% anatase titanium dioxide dispersions in water having an average crystallite size between about 5 nm and about 10 nm. PC500 is a 100% anatase titanium dioxide powder, which has a $TiO_2$ content between about 82% and about 86% by weight, and which has a surface area of about 250 to about 350 $m^2/g$, as measured by 5-point BET, which translates to an average particle size of about 5 nm to about 10 nm. The product designated PC50 and PC105, also from Millennium Inorganic Chemicals, will also find utility in some embodiments of the invention. PC50 comprises greater than 97% by weight titanium dioxide and PC105 comprises greater than 95% by weight titanium dioxide. The solid form of the $TiO_2$ for both PC50 and PC100 products is 100% anatase, and the surface area is between about 45 $m^2/g$ and about 55 $m^2/g$ and between about 80 and about 100 $m^2/g$, respectively. Of course, other sources of suitably photoactive titanium dioxide may be used in the invention and photocatalytic titanium dioxide may be prepared by any process known in the art. For example, the processes described in U.S. Pat. No. 4,012,338, which is incorporated by reference in its entirety, may be used to prepare photocatalytic titanium dioxide used in the coating compositions of the invention.

The inventive coating compositions will typically comprise from about 1% to about 20% photocatalytic titanium dioxide by volume of the dry coating composition (PVC). More typically, the compositions will comprise between about 1% to about 15% photocatalytic titanium dioxide by volume of the dry composition or about 1% to about 10%, and preferably from about 1% to about 5% or from about 1% to about 3% by volume. In one embodiment, the coating compositions of the invention comprise about 2.5% to about 5% photocatalytic titanium dioxide by volume of the dry coating composition. In another embodiment, the coating compositions comprise 5% to about 7.5% photocatalytic titanium dioxide PVC. The foregoing amounts of photocatalytic titanium dioxide represent the volume of photocatalyst in the dry paint composition taking into account only the photocatalyst, pigment, extender and binder.

It is within the scope of the invention to provide coating compositions having two or more different titanium dioxide photocatalysts, where at least one, and preferably each, of the titanium dioxide photocatalyst materials meet the specifications described above. Thus, for example, the invention embraces the use of bimodal photocatalytic titanium dioxide material, formed by combining two different titanium dioxide powders or sols, wherein at least one, and preferably both, have a particle size and/or surface area as defined above. In other embodiments, the photocatalyst will "consist essentially of" a particular titanium dioxide material described herein, by which is meant any additional photocatalyst having materially different activities is excluded, or that amounts of additional photocatalyst which materially impact the durability, de-polluting, or self-cleaning properties of the paint are excluded.

The coating compositions of the invention comprise one or more epoxy siloxane binders. The epoxy siloxane binder will typically comprise an epoxy-functional silicon compound component. In one embodiment, the epoxy-functional silicon compound is an epoxysiloxane resin which includes at least one epoxy functional group, including two or more epoxy groups, with a polysiloxane backbone. The binder will typically also comprise a curing agent component. The curing agent typically comprises a nucleophilic group that is capable of reacting with the epoxy functional group to form a ring-opened product.

Mixtures of two or more epoxy-functional silicon compounds and two or more curing agents are also embraced by the invention.

Epoxysiloxane resins are known in the art and any suitable epoxy siloxane resin may be used in the inventive compositions. Various commercially available epoxy-siloxane resin system may used with the present invention. For example, commercially available epoxy-siloxane resin systems sold by Degussa under the trade mark SILIKOPON® EW, SILIKOPON® EF (siloxane resin comprising cyclohexanol, 4,4'-(1-methylethylidene)bis-, polymer with (chloromethyl)oxyrane) and SILIKOFTAL® ED. Other commercially available epoxysiloxane resins that are useful with the present invention include SLM 43226 sold by Wacker; ES-1002T and ES-1001T (silicone modified epoxy resin) sold by Shin Etsu. Of course, other types of pre-formulated epoxy-siloxane resin systems may be used or epoxy-siloxane resins may be prepared by methods known in the art.

In another embodiment of the invention, the epoxy siloxane binder may be prepared from one or more suitable epoxy-containing compounds and one or more amino-containing compounds. Typically, the epoxy-functional compounds include epoxy-functional silicon compounds such as epoxy-functional polysiloxanes and/or epoxy-functional silanes, and the amino-functional compounds typically include amino-functional silicon compounds such as amino-functional polysiloxanes and/or amino-functional silanes.

In one embodiment, the epoxy-functional compound comprises one or more epoxy-functional silicon compounds, and the amino-functional compound comprises one or more amino-functional silicon compounds.

In one embodiment, the epoxy-functional silicon compound is an epoxy-functional polysiloxane. The epoxy groups may be introduced to the polysiloxane by means of an epoxysilane or by means of an epoxy resin, as described in EP 1 086 974 A, which is hereby incorporated by reference in its entirety. In one embodiment, the epoxy resin is a polymer of bis-4,4'-(1-methylethylidene)cyclohexanol with chloromethyloxirane. In one embodiment, the epoxy-functional polysiloxane is prepared by the reaction between an epoxy resin and a reactive polysiloxane. In another example, the epoxy-functional polysiloxane may be prepared by subjecting an epoxysilane and an alkoxysilane mixture to partial hydrolysis and condensation. It should be understood that the epoxy-functional polysiloxane may be prepared in situ if desirable. It should also be understood that the epoxy-functional polysiloxane may advantageously comprise alkoxy- and/or hydroxyl-functionalities.

Although not generally required, it is believed that it may be advantageous to utilize at least one epoxy-functional polysiloxane wherein the polysiloxane backbone or side chains to the polysiloxane backbone include —OH groups or alkoxy groups. Without being bound to any particular theory, it is believed that such hydroxy groups or alkoxy groups may participate in the curing of the tie-coat composition upon exposure to humid environments.

In another embodiment, the epoxy-functional silicon compound(s) is/are epoxysilane(s). In some embodiments, the epoxysilanes have the formula:

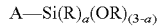

$$A—Si(R)_a(OR)_{(3-a)}$$

where A is an epoxide-substituted monovalent hydrocarbon radical; and each R independently is selected from alkyl including, but not limited to, methyl, ethyl, hexyl, octyl; alkoxy; aryl including phenyl; aralkyl and alkylaryl; and a is 0 or 1.

The group A in the epoxysilane is preferably a glycidoxy-substituted alkyl group, for example 3-glycidoxypropyl. The epoxysilane include, but are not limited to, 3-glycidoxypropyltrimethoxysilane, 3-glycidoxypropyltriethoxysilane, 3-glycidoxypropyldiethoxymethoxysilane, 2-glycidoxypropyl-trimethoxysilane, 3-(3,4-epoxycyclohexyl)propyltrimethoxysilane, 2-(3,4-epoxy-4-methyl-cyclohexyl)-ethyltrimethoxysilane, 5,6-epoxy-hexyltriethoxysilane.

Commercially available epoxysilanes are 5,6-epoxy-hexyl triethoxysilane (ABCR GmbH & Co. KG, Germany); 3-glycidoxypropyl methyldiethoxysilane (ABCR GmbH & Co. KG, Germany), -Y-glycidoxypropyyltrimethoxysilane (Dynasylan, Glymo, Sivento Chemie GmbH, Germany).

In other embodiments, the epoxy-functional silicon compound is combined with one or more siloxane polymers and silane compounds. Of course, mixtures of different epoxy-functional silicon compounds may also be used in the compositions.

In a still further embodiment, the epoxy-functional silicon compound is a combination of one or more epoxy-functional polysiloxanes and one or more epoxysilanes. For example, the binder phase may comprise one or more epoxy-functional polysiloxanes as well as one or more epoxysilanes. This combination may be prepared by adding an epoxy-functional polysiloxane (as described above) and an epoxysilane (as defined above), or by using a reaction product between an epoxysilane and a polysiloxane in which a portion of the epoxysilane remains unreacted.

In another embodiment, the epoxy siloxane binders used in the inventive coating compositions are prepared by addition of a curing component to a mixture comprising an epoxy-functional compound or resin and a silicon-functional compound or resin. As described above, the curing agent will typically comprise a nucleophilic group that will be able to react with epoxide groups in the epoxy resin component to form a ring-opened species and typically affect some degree of cross-linking process.

Epoxy resins are well known in the art. Any suitable epoxy resin comprising at least one 1,2-epoxy group that is capable of reacting with a nucleophile to form a ring-opened species may be used in the present invention. The epoxy containing materials may be aliphatic, cycloaliphatic, aromatic or the like. In another embodiment, the epoxy resin comprises two or more epoxide groups that are capable of reacting with a nucleophile to form ring-opened products.

Suitable epoxides include compounds and polymers having epoxy end groups such as diglycidyl ethers of a polyalkylene glycol and the like and epoxy groups and polymers having internal epoxide units such as polybutadiene polyepoxides. In one embodiment, the epoxy resin is a polymer of bis-4,4'-(1-methylethylidene)cyclohexanol with chloromethyloxirane. Furthermore, a mixture of various epoxy-containing materials can also be used.

Examples of suitable epoxy-containing materials include, but is not limited to, bisphenol A type epoxy resin; a bisphenol AD type epoxy resin; a bisphenol F type epoxy resin; bisphenol S type epoxy resin, bisphenol K type epoxy resin, a phenol novolac type epoxy resin; a cresol novolac type epoxy resin; an alycyclic epoxy resin; a heterocyclic ring-containing epoxy resin such as triglycidyl isocyanate and hydantoin epoxy; aromatic or aliphatic epoxy resins such as a hydrogenated bisphenol A type epoxy resin, propylene glycol-diglycidyl ether copolymer and pentaerythritol-polyglycidyl ether copolymer; an epoxy resin obtained by the reaction of an aromatic, aliphatic or alicyclic carboxylic acid and epichlorohydrin; a spiro ring-containing epoxy resin; a glydidyl ether type epoxy resin which is a reaction product of an o (ortho)-allylphenol novolac compound with epichlorohydrin; and a glycidyl ether type epoxy resin which is a reaction product of a diallylbisphenol compound having allyl groups located at positions ortho to the hydroxyl groups of bisphenol A with epichlorohydrin. In addition, it is possible to use derivatives such as ethylene oxide, propylene oxide, styrene oxide, cyclohexene oxide and phenyl glycidyl ether, as desired. These epoxy resins can be used singly or in the form of a mixture of at least two kinds of the epoxy resins.

The polysiloxane or silane component may be any polysiloxane or alkoxysilane known in the art that is capable of reacting with an epoxy resin in the presence of a curing agent. In some embodiments, the coating compositions comprise a mono-, di-, tri- or tetraalkoxysilane, including tetramethylsilane or tetraethylsilane.

The curing agent component may be a compound that comprises at least one nucleophilic group capable of reacting with an epoxide group to form a ring-opened product. In one embodiment, the curing agent comprises an oxygen or sulfur nucleophile, including hydroxyl and thiol groups and their salts. In another embodiment of the invention, the curing component comprises one or more amine nucleophiles, including aliphatic amines and diamines, aromatic amines, hydrazines, hydrazides, hydroxylamines, alkyelendiamines, Mannich bases, amino acids and the like. Addition of the curing agent will initiate hardening of the resin by reacting with epoxide groups in the epoxide siloxane resin, which will cause some degree of cross-linking of the resin. The curing agent will typically be mixed with the other components of the photocatalytic coating composition just prior to application. In addition, a catalyst may optionally be included with the curing agent or with the epoxy siloxane resin component to aid in the curing reaction. Any suitable catalyst that increases the rate of reaction of epoxide ring opening reactions known in the art may be used.

In other embodiments, the curing agent comprises a typical curing agent of epoxy paint compositions. Examples of commercially available curing agents include, but are not limited to, polyamines (arylyl): Epoxy Hardener MXDA sold by Mitsubishi Gas Chemical Company Inc USA; polyamines (aliphatic): DEAPA or DETA sold by BASF Germany; polyamines (cycloaliphatic): Aradur 42 BD sold by Huntsman Advanced Materials Switzerland; formulated amines: Sunmide 3-230N sold by Sanwa Chemical Company Inc USA, Ancamide X2280 sold by Air Products Plc USA, HY 1207 BD sold by Huntsman Advanced Materials Switzerland; polyamine adducts: Aradur 2964 CH or Aradur 2969 CH or Aradur 863 XW 80 CH or Aradur 837 CH or Aradur 943 CH sold by Huntsman Advanced Materials Switzerland, Ancamine 2074 or Ancamine 1734 or Ancamine 1735 or Ancamine 2134 sold by Air Products Plc USA; Polyaminoamides: Sunmide 300-60 LH or Sunmide 305-70X sold by Sanwa Chemical Singapore, Uni-rez 2125-X70 sold by Arizona Chemical USA, Ancamide 350A or Ancamide 2353 sold by Air Products Plc USA; Polyamide adducts: Aradur 460 J90 BD sold by Huntsman Advanced Materials Switzerland; Mannich bases: Ancamine MCA or Ancamine 1856 or Ancamine K54 sold by Air Products Plc USA, Polypox VH 40311/55 or Polypox VH 40294 sold by Ulf Prummer Polymer Chemie Germany, and Aradur 16 BD or Aradur 3441 X90 sold by Huntsman Advanced Materials Switzerland.

In one embodiment of the invention, the curing agent is an amino polysiloxane. Amino polysiloxanes typically include a linear or branched polymeric constituent having one or more polysiloxane chains and having at least one amino group.

In some embodiments, the amino functionalities may be introduced to the reactive polysiloxane by means of an aminosilane (i.e. an aminosilane such as those defined below), as described in U.S. Pat. No. 4,857,608, which is hereby incorporated by reference in its entirety. It should also be understood that the amino-functional polysiloxane may be prepared in situ. In some embodiments, a hydroxyl-functional or alkoxy-functional polysiloxane is reacted with an aminosilane whereby amino-functionalities are introduced. For example an aminosilane can be reacted with an α,ω-dihydroxypolydimethylsiloxane to produce an amino polysiloxane. In one embodiment, at least one amino-functional polysiloxane is the reaction product of a polysiloxane and an aminosilane.

In one embodiment, the amino polysiloxane is a α,ω-di-amino-functional polysiloxane (e.g. polysiloxane fluids). Non-limiting examples of commercially available amino-functional polysiloxanes are SILRES® HP 2000 (amino-functionalised methyl-phenyl silicone) sold by Wacker; SF1708 amino functionalised polysiloxane fluid sold by General Electric Co.

Although not generally required, it is believed that it may be advantageous to utilize at least one amino-functional polysiloxane wherein the polysiloxane backbone or side chains to the polysiloxane backbone include —OH groups or alkoxy groups. Without being bound to any particular theory, it is believed that such hydroxy groups or alkoxy groups may participate in the curing of the tie-coat composition upon exposure to humid environments.

In another embodiment, the curing agent comprises an amino silane. Any amino silane capable of reacting with an epoxide group on the epoxy siloxane resin to form a ring-opened product may be used in the present invention. Amino silanes may include a variety of compounds where at least one primary or secondary amine is linked to a silicon atom by a variety of linking groups, including alkylene groups, alkyleneoxide groups, arylene groups, cycloalkyl groups or a combination thereof. The amine functional groups may be substituted with linear or branched alkyl groups, aryl groups or may be part of a heterocyclic ring.

In one embodiment, the inventive coating compositions comprise amino silane of the general formula

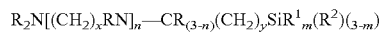

wherein each R group is independently hydrogen or a linear, branched or cyclic alkyl group or an aminoalkyl group of the form $R_2N(CH_2)_x$—; $R^1$ is a linear, cyclic or branched alkyl group; $R^2$ is an alkoxy group or acetoxy group; x is an integer from 1 to 10; y is an integer from 1 to 16; n is 0, 1, 2 or 3 and m is 0, 1 or 2.

In several embodiments, the amino silane may be 3-aminopropyltrimethoxysilane (AMMO), 3-aminopropyltriethoxysilane (AMEO), 3-aminopropylmethyldimethoxysilane, 3-aminopropylmethyldiethoxysilane, N-(2aminoethyl)-3-aminopropyltrimethoxysilane (DAMO), N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2aminoethyl)-3-aminopropyltriethoxysilane, N-(2-aminoethyl)-N'-(2-aminoethyl)-3-aminopropylmethyldimethoxysilane, N-2(2-aminoethyl)-N'-(2-aminoethyl)-3-aminopropylmethyldiethoxysilane, bis (triethoxysilylpropyl) amine, bis(trimethoxysilylpropyl) amine, N-(2-aminobutyl)-3-aminopropyltriethoxysilane, N-(2-aminobutyl)-3-aminopropyltrimethoxysilane, N-phenylaminopropyl trimethoxysilane, trimethoxysilylpropyl diethylene triamine, 3-(3-aminophenoxy) propyl trimethoxy silane, amino ethyl amino methyl phenyl trimethoxy silane, 2-aminoethyl-3-aminopropyl, tris 2 ethyl hexoxysilane, n-aminohexyl aminopropyl trimethoxysilane and trisaminopropyl trismethoxy ethoxy silane or mixtures thereof.

Also suitable are condensates or co-condensates of the aforementioned aminosilanes. The condensates or co-condensates may also be used in the form of partial hydrolysates, examples being DYNASYLAN® 1146 and 1148. Other useful particular amino silanes include those sold by Degussa/

Evonik Industries under the trade name DYNASYLAN® AMEO, DYNASYLAN® AMEO-T and DYNASYLAN® AMMO.

It is also possible to use co-condensates obtained from an aminosilane and at least one other organic silane, such as a tetraalkoxysilane. Such condensates or co-condensates can be found, for example, in the German patent application 101 51 264.3.

The inventive photocatalytic coating compositions typically comprise between about 30% to about 95% binder by volume of the dry coating. This concentration refers to the total binder content per volume of the dry composition, which may include mixtures of two or more binders. More typically, the amount of binder in the composition is between about 40% to about 95%, about 50% to about 95%, or about 60% to about 95%. In other embodiments, the coating compositions will comprise about 30% to about 90% binder or about 40%, 50%, 60% or 70% to about 90% binder by volume of the dry coating. Preferably, the amount of binder will be about 65% to about 85% or about 70% to about 85% by volume of the dry coating. More preferably, the coating compositions will comprise about 65% or 70% to about 80% binder by volume of the dry coating.

In addition to the photocatalytic titanium dioxide, the coating compositions of the invention may further comprise one or more pigments. The term "pigments" is intended to embrace, without limitation, pigmentary compounds employed as colorants, including white pigments, as well as ingredients commonly known in the art as "opacifying agents". Included are any particulate organic or inorganic compounds able to provide hiding power to the coating, and in particular at least one inorganic compound like pigmentary grade titanium dioxide. Such titanium dioxide pigments are disclosed in U.S. Pat. No. 6,342,099 (Millennium Inorganic Chemicals Inc.), the disclosure of which is hereby incorporated by reference. In particular, the titanium dioxide pigment may be the particles of Tiona™ 595 or Tiona™ 696 sold by Millennium Inorganic Chemicals Ltd. Pigmentary grade titanium dioxide are typically in the rutile form and have less photocatalytic activity. Pigmentary titanium dioxide may comprise a coating of aluminum oxide, silicon dioxide, or the like as a passivating layer on the surface of the particles.

The coating compositions according to the invention typically, but not necessarily, have a pigment concentration between about 5% and about 30% by volume of the dry composition (PVC), more typically between about 5% and about 25%, or between about 5% and about 20%. Preferably the coating compositions comprise between about 10% and about 20% pigment (PVC).

The coating compositions of the invention also typically comprise extenders or fillers which serve to thicken coating films and support the structure of the coating composition. In polymer or plastic applications, these components are commonly referred to as fillers, while in coating applications they are referred to as extenders. Some extenders may also provide hiding power and function as pigments, particularly above the critical pigment volume concentration, and most extenders are color neutral. Common extenders include clays such as kaolin clays, China clays, talcs, quartz, barytes (barium sulphate) and carbonate salts such as calcium carbonate, zinc carbonate, magnesium carbonate or mixtures thereof.

There is no limitation on the amount of extender used in the compositions, however, typically the inventive coating compositions comprise between about 1% to about 50% extender by volume of the dry coating composition (PVC). In some embodiments, the compositions will comprise between about 1% to about 30%, from about 1% to about 20% or from 1% to about 10% by volume. In other embodiments, the compositions will comprise between about 5% to about 20%, between about 5% to about 15% or between about 10% to about 20% extender by volume.

Extenders that are alkaline are particularly useful because they can neutralize acidic species such as nitric and nitrous acid that are formed from the photocatalytic oxidation of $NO_x$ species. The nitrites and nitrate salts formed from the neutralization of nitric and nitrous acids are dissolved and removed from the coating upon contact with water. Any extender that is alkaline is capable of reacting with nitrous or nitric acid, including carbonate salts such as calcium carbonate, zinc carbonate, magnesium carbonate and mixtures thereof. The most commonly used alkaline extender in coating applications is calcium carbonate. Mixtures of two or more extenders are also contemplated in the inventive coating compositions. In some embodiments, extenders that are not alkaline such as China clays, kaolin clays or silica may be mixed with an alkaline extender.

The total pigment volume concentration (PVC) of the coating compositions, which includes the total amount of photocatalytic $TiO_2$, pigment and any extenders, will typically be about 1% to about 70% by volume of the dry coating composition. In some embodiments, the total PVC will be about 1% to about 60%, about 5% to about 70%, 5% to about 60%, 5% to about 50% or about 5% to about 40% by volume (PVC). More typically, the total PVC will be about 10% to about 70%, about 10% to about 60%, about 10% to about 50%, about 10% to about 40% or about 10% to about 30% by volume. In still other embodiments, the total PVC will be about 15% to about 35% or about 15% to about 30% by volume. Preferably, the total PVC of the coating compositions will be about 20% to about 35% or about 20% to about 30% by volume.

If necessary, various other compounds may be added to the composition of the invention, but preferably such an addition does not compromise the shelf life, photoactivity, durability or non-staining properties of the resulting coating. Examples of such additional compounds include filler(s) such as quartz, calcite, clay, talc, barite and/or Na—Al-silicate, and the like; pigments like $TiO_2$, lithopone, and other inorganic pigments. Other additives include dispersants, wetting agents, thixotropes such as bentones based on montmorillonite clays, additives for flow control, leveling control, mar resistance, sagging control and anti-crater agents.

It has surprisingly been found that coating compositions comprising photocatalytic $TiO_2$ and an epoxy siloxane binder with total pigment volume concentrations (PVC) lower than 50% have significant photocatalytic activity and effectively oxidize $NO_x$ compounds when activated by light. Previously, it was thought that photocatalytic coating compositions with a high polymer content and correspondingly low total pigment volume concentration would not have sufficient photocatalytic activity to produce useful de-polluting and self cleaning coatings. For example, photocatalytic coating compositions are typically prepared with total PVC levels of 50% or higher to ensure sufficient photocatalytic activity. It was previously considered that coating compositions with significantly lower levels of PVC would not provide sufficient photocatalytic activity because the content and concentration of the photocatalytic $TiO_2$ particles would be insufficient in the high polymer content coatings.

The inventive coating compositions comprising an epoxy siloxane binder and photocatalytic $TiO_2$ were found to have significant photocatalytic activity and exhibited excellent durability at total pigment volume concentrations well below 50%, providing durable photocatalytic coatings with excellent gloss and opacity. A significant benefit of the inventive compositions and coatings is that one coating of the inventive compositions will provide the same corrosion resistance and durability as two separate coatings of an epoxy based coating and a polyurethane coating with the added benefit that the coatings are self-cleaning and de-polluting. Therefore, the inventive coatings offer a significant cost reduction and improved performance over standard coatings.

The following examples are presented to aid in an understanding of the present invention and are not intended to, and should not be construed to limit the invention in any way. All alternatives, modification and equivalents which may become obvious to those of ordinary skill in the art upon a reading of the preset disclosure are included within the spirit and scope of the invention.

EXAMPLES

Preparation of Coating Compositions

Each composition comprised 15% Tiona™ 595 pigmentary $TiO_2$ or Tiona 696 pigmentary $TiO_2$ and PC105 photocatalytic $TiO_2$ (PVC) from Millennium Inorganic Inorganic Chemicals. The amount of photocatalyst depends on the specific formulation. The coating compositions are by successively adding pigmentary $TiO_2$, $TiO_2$ photocatalyst and extender are to a polysiloxane resin diluted with butyl acetate with mixing and the resulting mixture is mixed further under high shear for 20 minutes. The polysiloxane resin sold by Degussa under the trade name SILIKOPON® EF was used for the coating compositions described below. Immediately prior to coating the substrates, an amino silane curing agent was added the polysiloxane resin and other components with good mixing. The amino silane sold by Degussa under the trade name DYNASYLAN® AMEO was used for the coating compositions described below. The invention is not limited by any specific epoxy siloxane binder and alternate epoxy siloxane resins and curing agents are embraced by the invention.

Each paint sample is applied to obtain a 150 μm coating (based on the dried weight of the coating) on a substrate and the substrates were tested for their ability to remove NOx compounds, self-cleaning ability and durability.

Example 1

NO Activity Correlated with Total PVC

The complete methodology for determining NOx removal is described in U.S. Patent Pub. 2007/0167551, the disclosure of which is hereby incorporated by reference. Briefly, the samples were placed in an air-tight sample chamber and sealed. The sample chamber is in communication with a three channel gas mixer (Brooks Instruments, Holland) through which NO (nitric oxide), $NO_2$ (nitrogen dioxide), and compressed air containing water vapor are introduced into the chamber at predetermined levels. Coatings comprising epoxy siloxane binder sold under the trade names SILIKOPON® EF and DYNASYLAN® AMEO were prepared from compositions comprising 7.5% PC105 photocatalytic $TiO_2$ and 15% Tiona 595 pigmentary $TiO_2$ (PVC) with total % PVC levels of 30%, 40%, 50%, 60%, and 70%. The difference in total PVC in the coatings was made up by the extender, calcium carbonate. The samples are irradiated with 8 $W/m^2$ UV radiation in the range of 300 to 400 nm from a UV Lamp Model VL-6LM 365 & 312 nanometer wavelengths (BDH). Initial values and final values (after five minutes irradiation) of NOx were measured by a Nitrogen Oxides Analyser Model ML9841B (Monitor Europe) connected to the sample chamber. The reduction in NOx was measured as (ΔNOx/Initial NOx)×100.

The paints were also tested for NO activity using 225 ppb NO in Nitrogen. The samples were tested initially without any conditioning and after 7 and 28 days exposure in the Atlas Weatherometer. The results are shown in FIG. 1.

None of the coatings exhibited photocatalytic activity without preconditioning, such as exposure to UV or visible light. The coatings with the photocatalyst did however show significant activity after 7 and 28 days exposure in the Atlas Weatherometer. Surprisingly, the coating with 30% PVC was found to have significant photocatalytic activity, removing approximately 58-65% NO after 7 and 28 days.

As FIG. 1 shows, the compositions with 60% and 70% PVC exhibited the highest photocatalytic activity, removing approximately 65-75% NO after one week of exposure and approximately 55-75% NO after 4 weeks of exposure. The coating compositions with 40% and 50% PVC were significantly less active. However, the coating with 30% PVC unexpectedly exhibited improved photocatalytic activity, removing approximately 58% NO after 1 week and 65% NO after 4 weeks of exposure.

Example 2

Optimization of NO Activity

Figure 2:
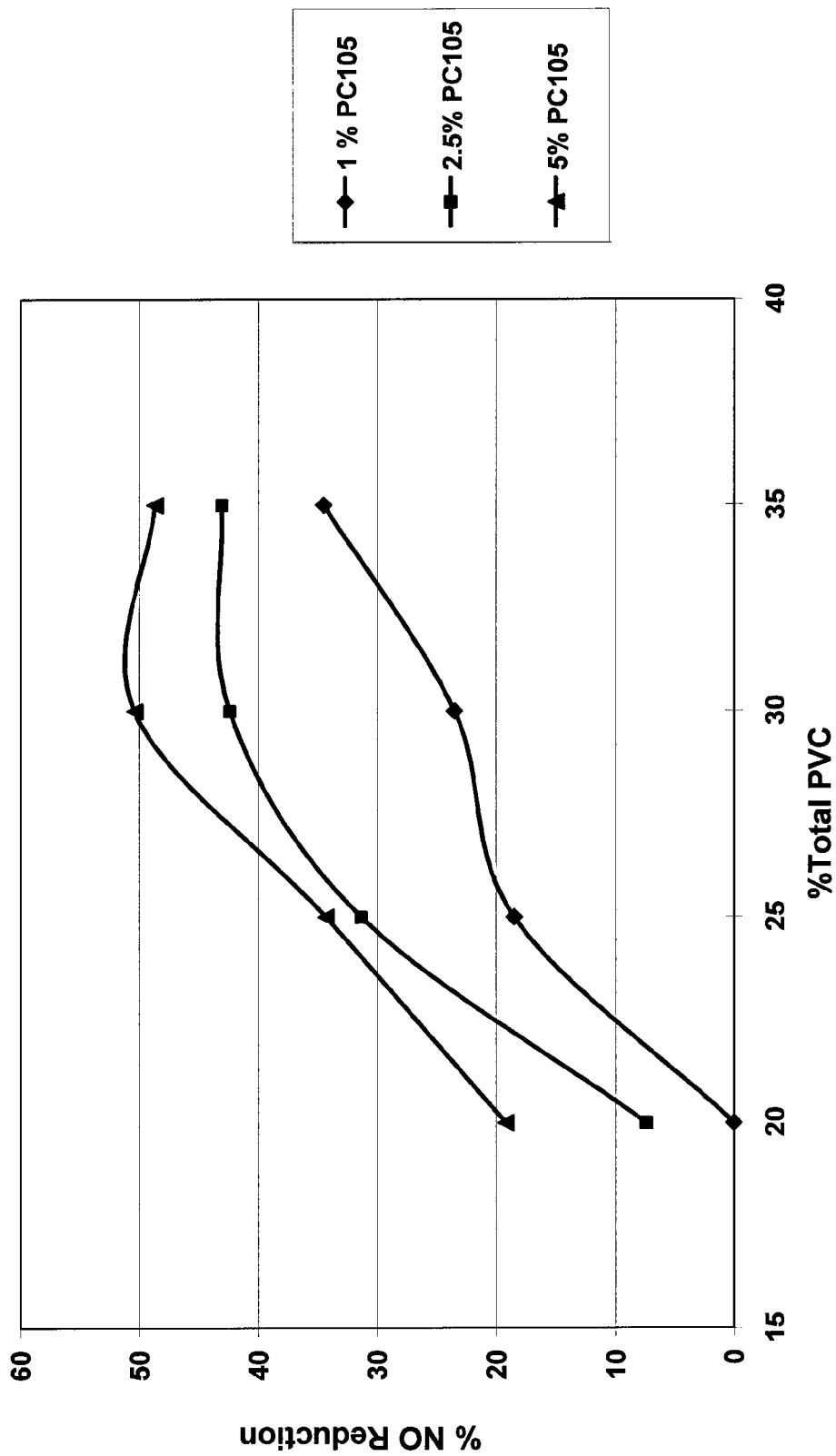
FIG. 2 shows the NO-removing activity of coatings comprising epoxy siloxane binder with 20-35% total PVC and 0, 1, 2.5 and 5% photocatalytic $TiO_2$.

The photocatalytic activity and durability of coatings with lower levels of total PVC and catalytic $TiO_2$ were evaluated. Coatings comprising epoxy siloxane binder with 15% PVC Tiona 595 pigmentary $TiO_2$, photocatalytic PC105 $TiO_2$ concentrations of 1%, 2.5% and 5% (PVC) and total PVC levels of 20%, 25%, 30% and 35% were evaluated for NO reduction activity initially and after 7 and 28 days exposure in the Atlas Weatherometer. The pigmentary $TiO_2$ in the samples was kept constant at 15% PVC and the difference in PVC was made up by calcium carbonate. The percentage NO removed as measured with the Nitrogen Oxides Analyser Model ML9841B is shown for 0, 7 and 28 days weathering in Table 1 below. The percentage of NO reduction after 7 days weathering is depicted graphically in FIG. 2.

TABLE 1

| % Total PVC | % PC105 | Initial | After 7 | After 28 |
| --- | --- | --- | --- | --- |
| 35 | 0.0 | 0.0 | 0.0 | 0.0 |
| 20 | 0.0 | 0.9 | 0.4 | 0.0 |
| 20 | 1.0 | 0 | 0 | 0 |
| 20 | 2.5 | 0.0 | 7.4 | 12.8 |
| 20 | 5.0 | 0.0 | 19.2 | 21.5 |
| 25 | 1.0 | −1.8 | 18.5 | 7.3 |
| 25 | 2.5 | 3.4 | 31.3 | 26.7 |
| 25 | 5.0 | 2.2 | 34.3 | 26.4 |
| 30 | 1.0 | −0.9 | 23.5 | 9.8 |
| 30 | 2.5 | −1.3 | 42.4 | 20.6 |
| 30 | 5.0 | 0.0 | 50.4 | 25.0 |
| 35 | 1.0 | 0.0 | 34.5 | 17.1 |
| 35 | 2.5 | 0.4 | 43.1 | 34.2 |
| 35 | 5.0 | 0.0 | 48.7 | 22.3 |

As expected the coatings with higher levels of photocatalyst (2.5% and 5%) show better NO reduction. Importantly, it was found that all samples with the exception of the coating with 20% PVC and 1% photocatalyst showed photoactivity. The samples with 30% and 35% PVC and 2.5% and 5% photocatalyst exhibited significant photocatalytic activity. The coatings again showed almost no activity initially but showed significant activity after exposure in the Weatherometer. The 7-day results generally showed greater activity. The results also showed that the activity generally increases as the level of photocatalyst and PVC are increased.

Example 3

Coating Durability Correlated to Photocatalyst Level

Durability

The durability of various photocatalytic coatings derived from compositions comprising photocatalytic $TiO_2$ and an epoxy siloxane binder was evaluated. Coatings were applied to stainless steel panels and the durability evaluated as weight loss per 100 $cm^2$ of coating and exposed to accelerated weathering conditions for various timeframes. The complete methodology for determining durability of the paints is described in U.S. Patent Pub. 2007/0167551, the disclosure of which is hereby incorporated by reference. The methodology involves accelerated weathering of 20 to 50 micron thick paint films on a stainless steel substrate in a Ci65A Weatherometer (Atlas Electric Devices, Chicago) under a 6.5 kW Xenon source. The level of UV radiation at the panel surface being 0.50 $W/m^2$ UV at 340 nm. The radiant heat from the Xenon light source raising the temperature of the white panels to 35° C. and water spray was applied for 18 minutes out of every 120 minutes, with no dark cycle. The durability is measured as a function of the weight loss of the sample following exposure.

A. Durability of Coating with 18% PVC and 0-6% Photocatalytic $TiO_2$

Figure 3:
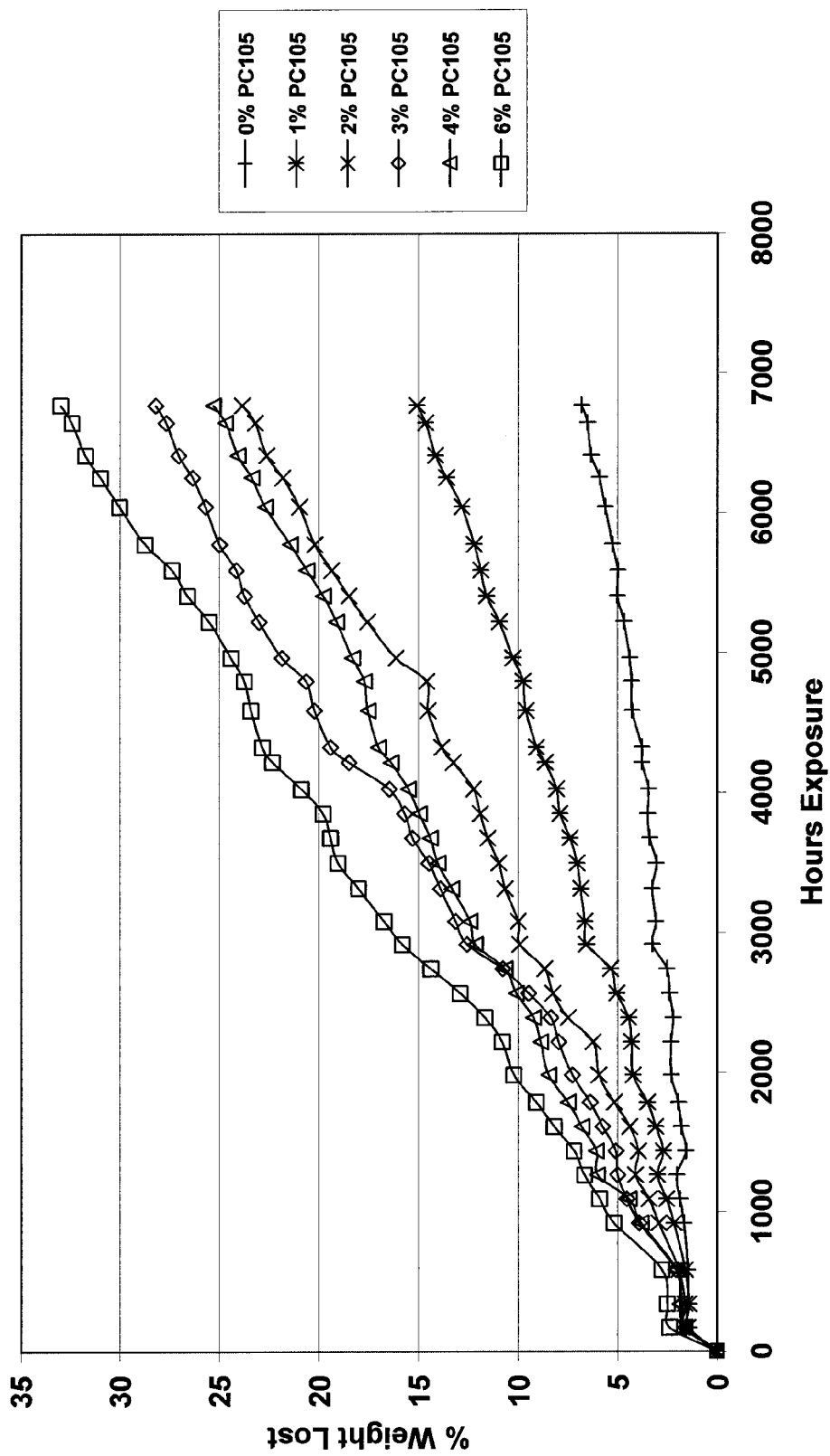
FIG. 3 shows the durability of coatings comprising epoxy siloxane binder with 18% total PVC and 0-6% photocatalyst.

Since typical topcoat epoxy siloxane based coatings are prepared at a total pigment volume concentration of approximately 15% to 18% PVC, coating compositions comprising SILIKOPON® EF and cured with amino siloxane DYNASYLAN® AMEO were prepared and their durability was evaluated. The coatings were prepared with 0, 1, 2, 3, 4, 5 and 6% PC105 photocatalytic $TiO_2$ (PVC) with a total pigment volume concentration of 18%, as recommended by the manufacturer, to evaluate the effect of photocatalyst level on the durability of the coatings. The durability of coatings is evaluated as a function of the weight loss of the sample following exposure to accelerated weathering conditions in a Ci65A Weatherometer (Atlas Electric Devices, Chicago) under a 6.5 kW Xenon The level of UV radiation at the panel surface being 0.50 $W/m^2$ UV at 340 nm. The coatings were exposed in the Atlas Weatherometer for a total of 6772 hours. The durability of the coatings with different levels of photocatalytic $TiO_2$ is shown in FIG. 3. As the chart demonstrates, the weight loss of the coatings is directly related to the level of photocatalyst.

B. Durability of Coatings with 30-70% PVC and 7.5% Photocatalytic $TiO_2$

Figure 4:
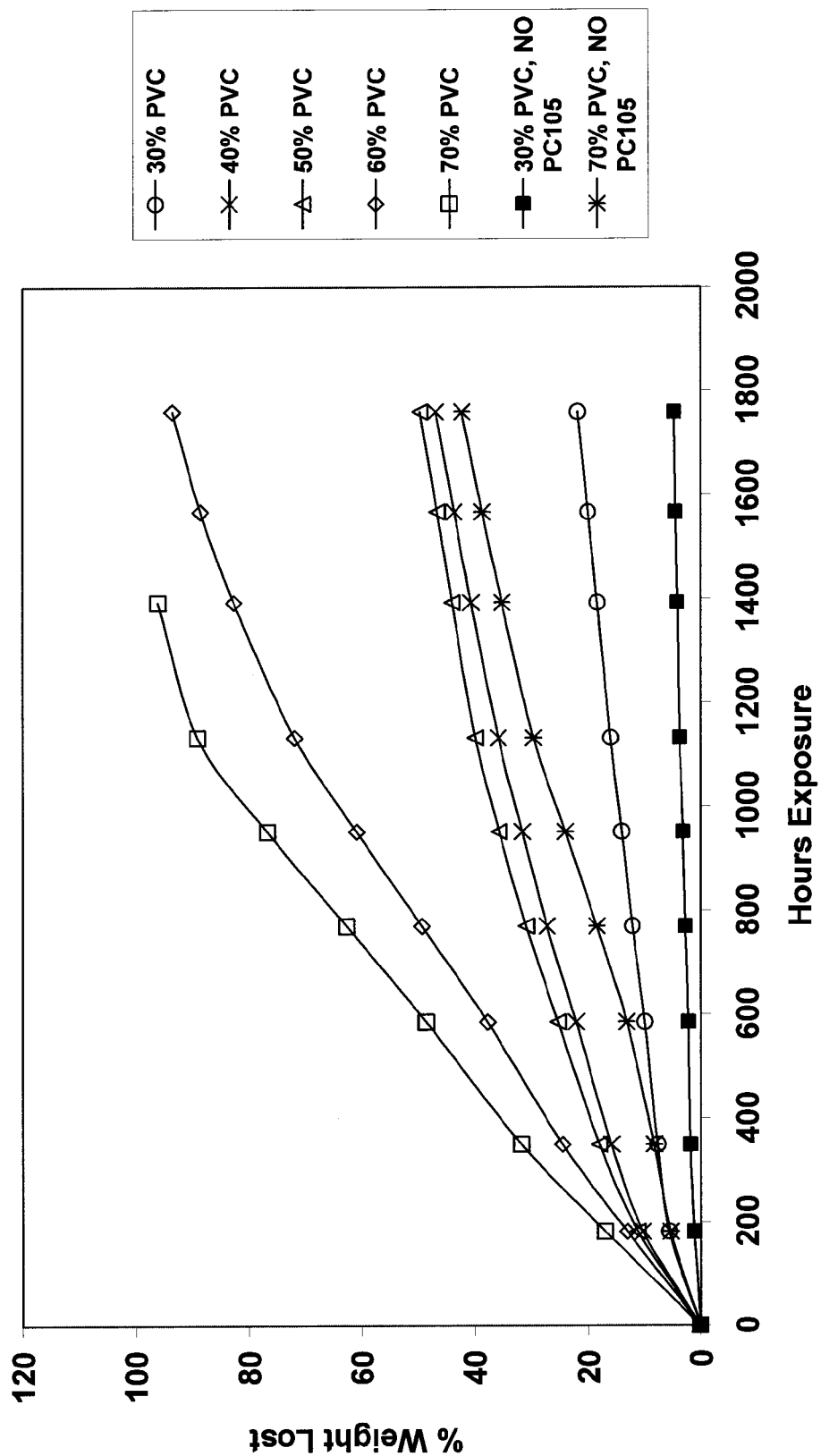
FIG. 4 shows the durability of coatings comprising epoxy siloxane binder with 30-70% total PVC and 7.5% photocatalyst.

The durability of coatings comprising epoxy siloxane binder with 7.5% photocatalytic $TiO_2$ and total PVC levels of 30%, 40%, 50%, 60% and 70% were prepared according to the standard procedure. FIG. 4 shows the durability of the coatings with total PVC levels of 30-70% PVC and 7.5% photocatalytic $TiO_2$ (PVC) discussed above with respect to photocatalytic activity. The coatings were exposed in Atlas Weatherometer for a total of 1760 hours. The chart shows that coatings with total PVC levels of 60% and 70% lose weight significantly faster than coatings with lower PVC levels. However, the coating with 30% total PVC and 7.5% photocatalyst was found to have better durability than a coating with 70% total PVC and no photocatalyst. Furthermore, at the 30% total PVC and 7.5% photocatalyst level, the coating weight loss is reduced to approximately 4 times that of a blank at the same total PVC.

C. Durability of Coatings with 20-35% PVC and 1, 2.5 and 5% Photocatalyst

The durability of coatings with 20, 25, 30 and 35% total PVC and 1, 2.5 and 5% (PVC) photocatalyst level was determined. The compositions used to produce the coatings are presented below in Table 2 below. The quantities of each component are presented in weight % and the total PVC and photocatalyst PVC is indicated as volume % of the dry coating.

TABLE 2

| | Total PVC | | | | | | |
|---|---|---|---|---|---|---|---|
| | 20.0 | 20.0 | 20.0 | 25.0 | 25.0 | 25.0 | 30.0 |
| Photocat. PVC | 1.0 | 2.5 | 5.0 | 1.0 | 2.5 | 5.0 | 1.0 |
| Pig. $TiO_2$ | 37.47 | 37.02 | 36.29 | 35.69 | 35.24 | 34.58 | 34.00 |
| Photocat. $TiO_2$ | 2.50 | 6.17 | 12.10 | 2.38 | 5.87 | 11.53 | 2.27 |
| $CaCO_3$ | 6.74 | 4.16 | 0 | 14.44 | 11.89 | 7.78 | 21.42 |
| Silikopon EF | 41.84 | 41.34 | 40.52 | 37.32 | 36.89 | 36.20 | 33.22 |
| Dynasylan AMEO | 11.45 | 11.31 | 11.09 | 10.21 | 10.09 | 9.90 | 9.09 |
| butyl acetate | 1.87 | 1.85 | 1.81 | 1.78 | 1.76 | 1.73 | 1.70 |
| | Total PVC | | | | | | |
| | 30.0 | 30.0 | 35.0 | 35.0 | 35.0 | 20.0 | 35.0 |
| Photocat. PVC | 2.5 | 5.0 | 1.0 | 2.5 | 5.0 | 0 | 0 |
| Pig. $TiO_2$ | 33.63 | 33.03 | 32.50 | 32.16 | 31.61 | 37.78 | 32.73 |
| Photocat. $TiO_2$ | 5.61 | 11.01 | 2.17 | 5.36 | 10.54 | 0 | 0 |
| $CaCO_3$ | 18.92 | 14.86 | 27.79 | 25.32 | 21.34 | 8.50 | 29.46 |
| Silikopon EF | 32.86 | 32.27 | 29.48 | 29.18 | 28.68 | 42.18 | 29.69 |
| Dynasylan AMEO | 8.99 | 8.83 | 8.07 | 7.98 | 7.85 | 11.54 | 8.12 |
| butyl acetate | 1.68 | 1.65 | 1.62 | 1.61 | 1.58 | 1.89 | 1.64 |

Figure 5:
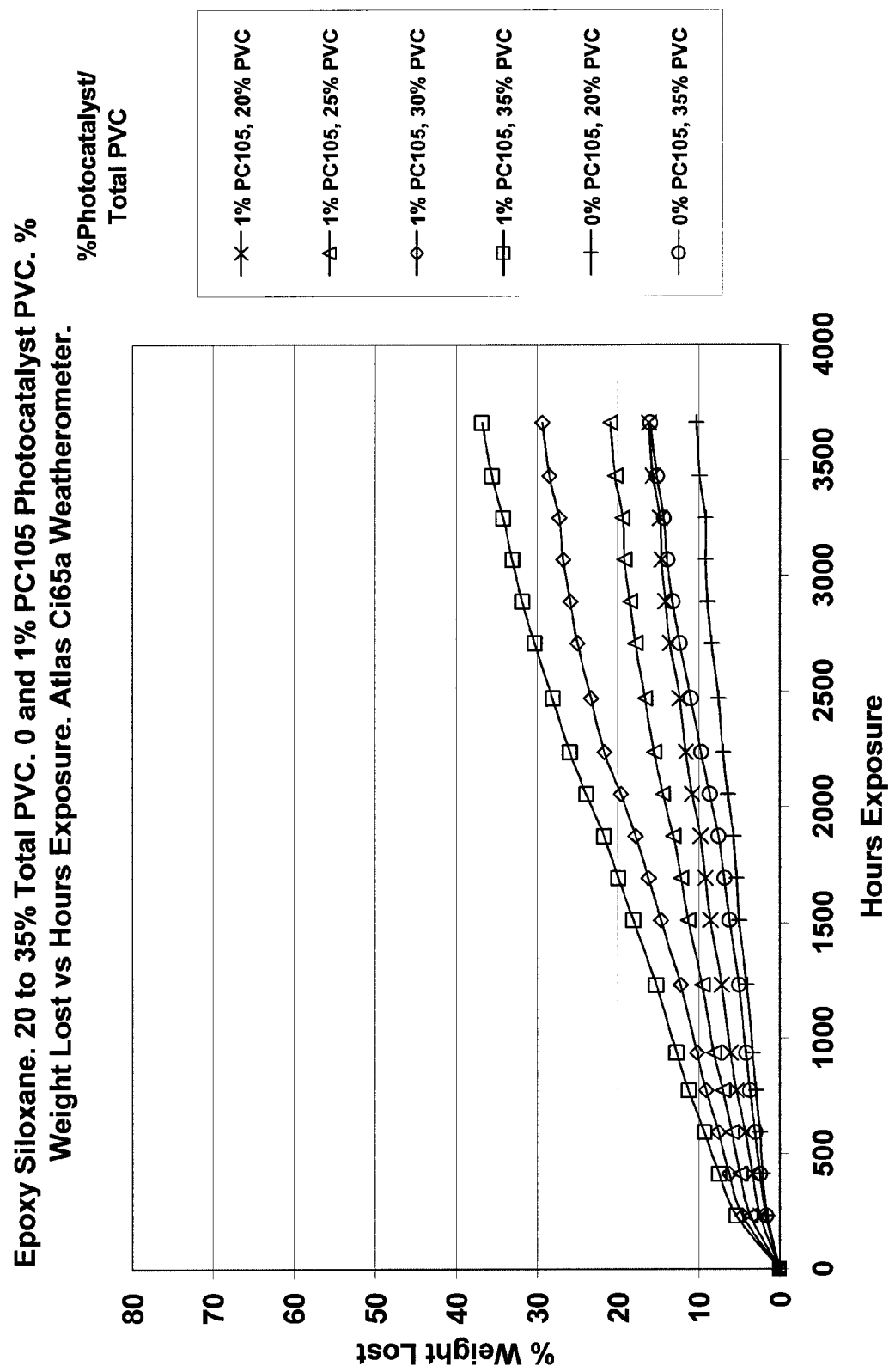
FIG. 5 shows the durability of coatings comprising epoxy siloxane binder with 20-35% total PVC and 0 and 1% photocatalyst.
Figure 6:
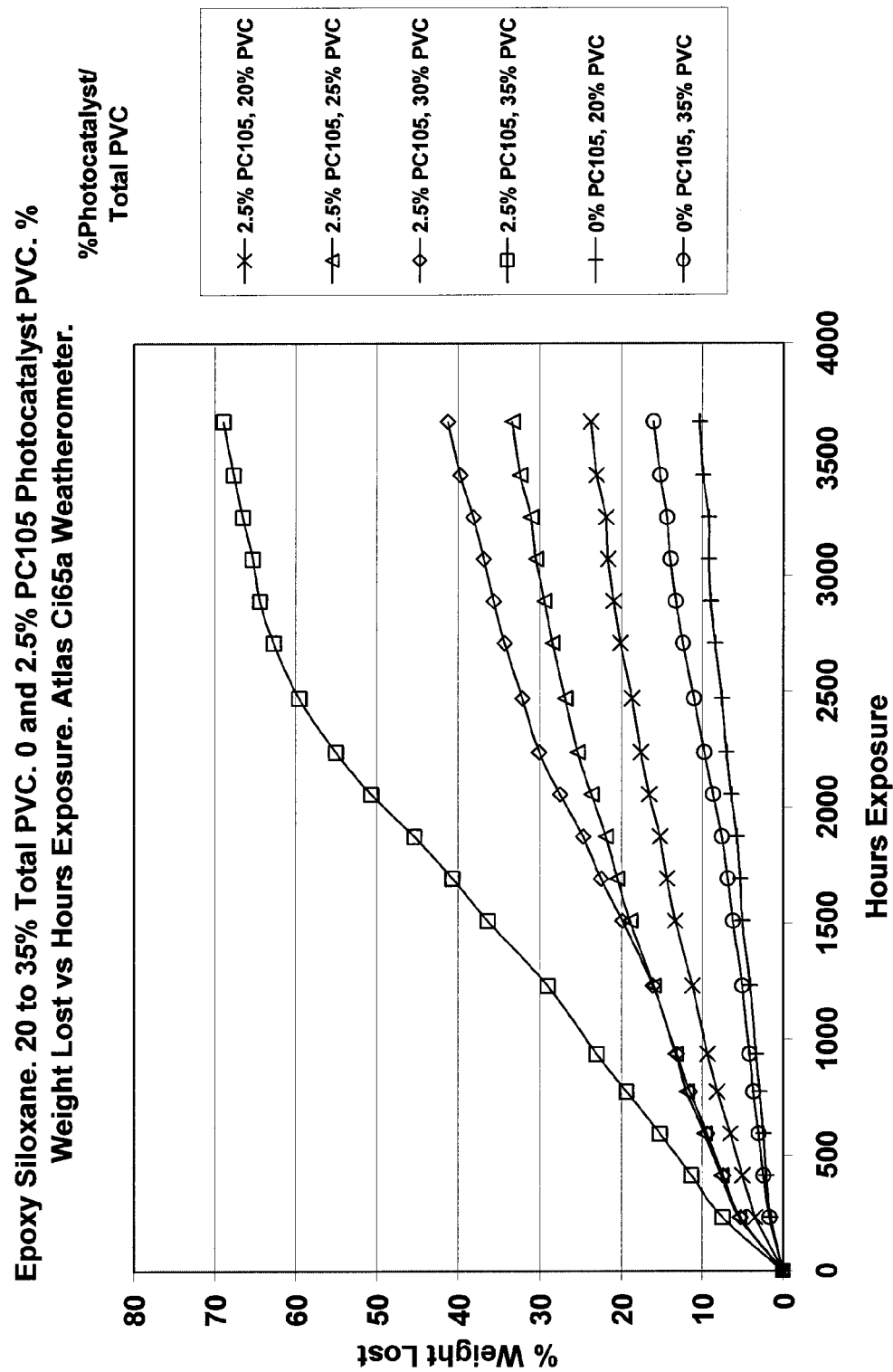
FIG. 6 shows the durability of coatings comprising epoxy siloxane binder with 20-35% total PVC and 0 and 2.5% photocatalyst.
Figure 7:
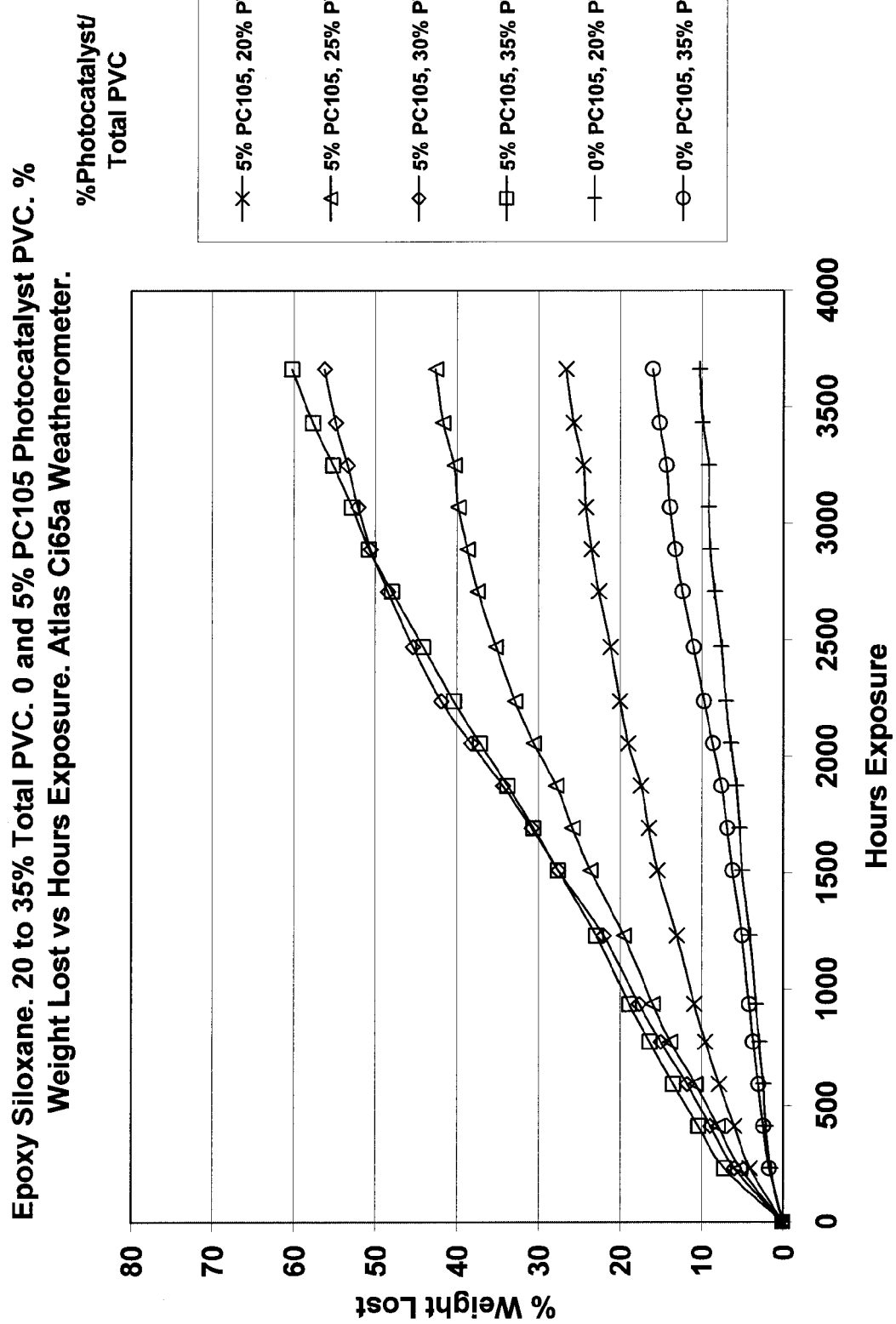
FIG. 7 shows the durability of coatings comprising epoxy siloxane binder with 20-35% total PVC and 0 and 5% photocatalyst.

The coatings were exposed in the Atlas Weatherometer for a total of 3663 hours. FIGS. 5, 6 and 7 show the weight lost of the coatings as % weight lost of the paint film as a factor of photocatalyst loading. FIG. 5 shows the durability of coatings with total PVC values of 20%, 25%, 30% and 35% and 1% photocatalyst (PVC). FIGS. 6 and 7 show the durability of coatings with the same total PVC levels and 2.5% or 5% photocatalyst, respectively. Also included for comparison are coatings with 20% and 355 PVC without any photocatalyst. The durability of the coatings decreases with higher total PVC and higher photocatalyst $TiO_2$ levels. The coating with the highest weight loss had 35% PVC and a catalyst level of 2.5% PVC. The coating with the lowest weight loss or best durability had the lowest total PVC (20%) with no photocatalyst.

Based on the data obtained from accelerated weathering experiments, a multiple regression analysis between the total PVC, photocatalyst PVC and the weight loss of coatings in milligrams at 595 hours of exposure resulted in the relationship weight loss=2.81×total PVC+9.79×photocatalyst PVC−45.07, with an $R^2$ value of 0.76, showing that the level of photocatalyst is most important for the durability of the coatings.

Figure 8:
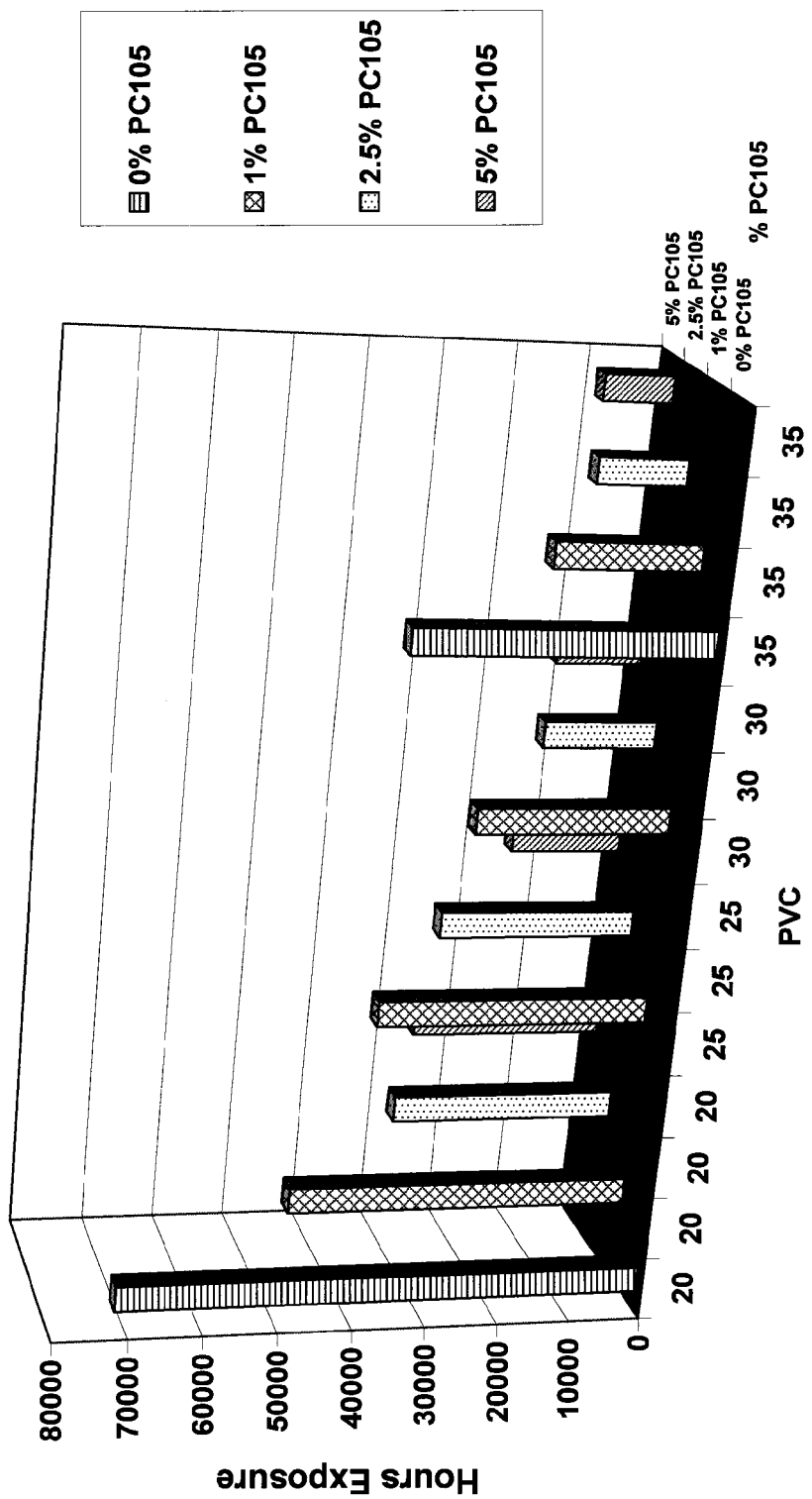
FIG. 8 shows the calculated half life of 150 mm thick coatings as a factor of total PVC and photocatalyst level in accelerated weathering conditions.

FIG. 8 shows the calculated half life in hours of the inventive coatings with varying levels of total PVC and photocatalyst levels. As discussed above, the half life is adversely affected by higher levels of total PVC and photocatalyst. However, intermediate levels of both total PVC and photocatalyst exhibit reasonably long half lives under accelerated weathering conditions, indicating excellent durability.

Based on this relationship and the typical film thickness of 150 microns, it was calculated that a coating comprising epoxy siloxane binder without any photocatalyst and 20% PVC would have a half life of approximately 80,000 hours or 9 years at the conditions tested. A coating comprising 35% PVC and 2.5% photocatalyst, the sample with the highest observed weight loss, would have a half life of approximately 8,500 hours or 1 year in the Atlas Weatherometer. These half lives are calculated for the accelerated conditions in the Atlas Weatherometer. Actual half lives under more realistic environmental conditions would be significantly longer. For example based on a half life of 80,000 in the Atlas Weatherometer, an estimated half life of more than 60 years in a subtropical climate similar to that of Florida is predicted. A half life of 1 year in the Atlas Weatherometer corresponds to approximately 7 years in a subtropical environment, such as Florida.

Example 4

Determination of Coating Photoactivity Towards Methyl Red

The most common way of evaluating coatings for self-cleaning is to apply a dye such as methylene blue to the coating and expose it to ultra-violet light. The change in L* or b* value of the CIELAB color scale (CIE Technical Report, Colorimetry, *Publ. CIE* 15.2-1986, CIE Central Bureau Vienna, Austria) being a measure of the self-cleaning potential of the coating. The epoxy siloxane coatings are not readily stained with water-based solutions of methylene blue and an alternative had to be found. Methyl red in Isopropanol was found to stain the films and this was used in place of the methylene blue. (The methodology employed for determining photoactivity toward methyl toward methylene blue is described in, for example, U.S. Patent Pub. 2007/0167551, the disclosure of which is hereby incorporated by reference.)

The self-cleaning properties of each paint sample were investigated based on their ability to degrade the organic dye methyl red. As the dye is degraded to water, carbon dioxide, and nitrogen containing species, a loss of color is observed. The photoactivity is monitored by measuring b* (blue/yellowness). The protocol is as follows:

Prepare a film of the paint on a suitable substrate such as Melinex film, aluminum panel, or glass plate. The film thickness should be similar to that used in the final application and generally not less than 25 microns thick when dry. The paint film is allowed to dry at least overnight.

Prepare a solution of methyl red by dissolving it in isopropanol to give a concentration of 1 mmol/L. Pour the methyl red solution into a suitable dish in which to immerse the paint film. Soak the paint films in the methyl red solution for 30 to 60 minutes to ensure that the methyl red is chemically absorbed onto the surface of the $TiO_2$.

Remove the paint film from the solution and remove excess with absorbent tissue. Thoroughly dry the paint films and then measure the b* value using a colorimeter or spectrophotometer.

Expose the paint films to UV light for a period of between 18 to 48 hours at an intensity of 30 to 60 $W/m^2$ (300-400 nm wavelengths) such as in an Atlas Suntest cabinet.

Re-measure the b* value. The difference between the initial and final b* measurements is a measure of the self-cleaning power of the coating. The larger the difference in b* value the greater the self-cleaning effect.

Figure 9:
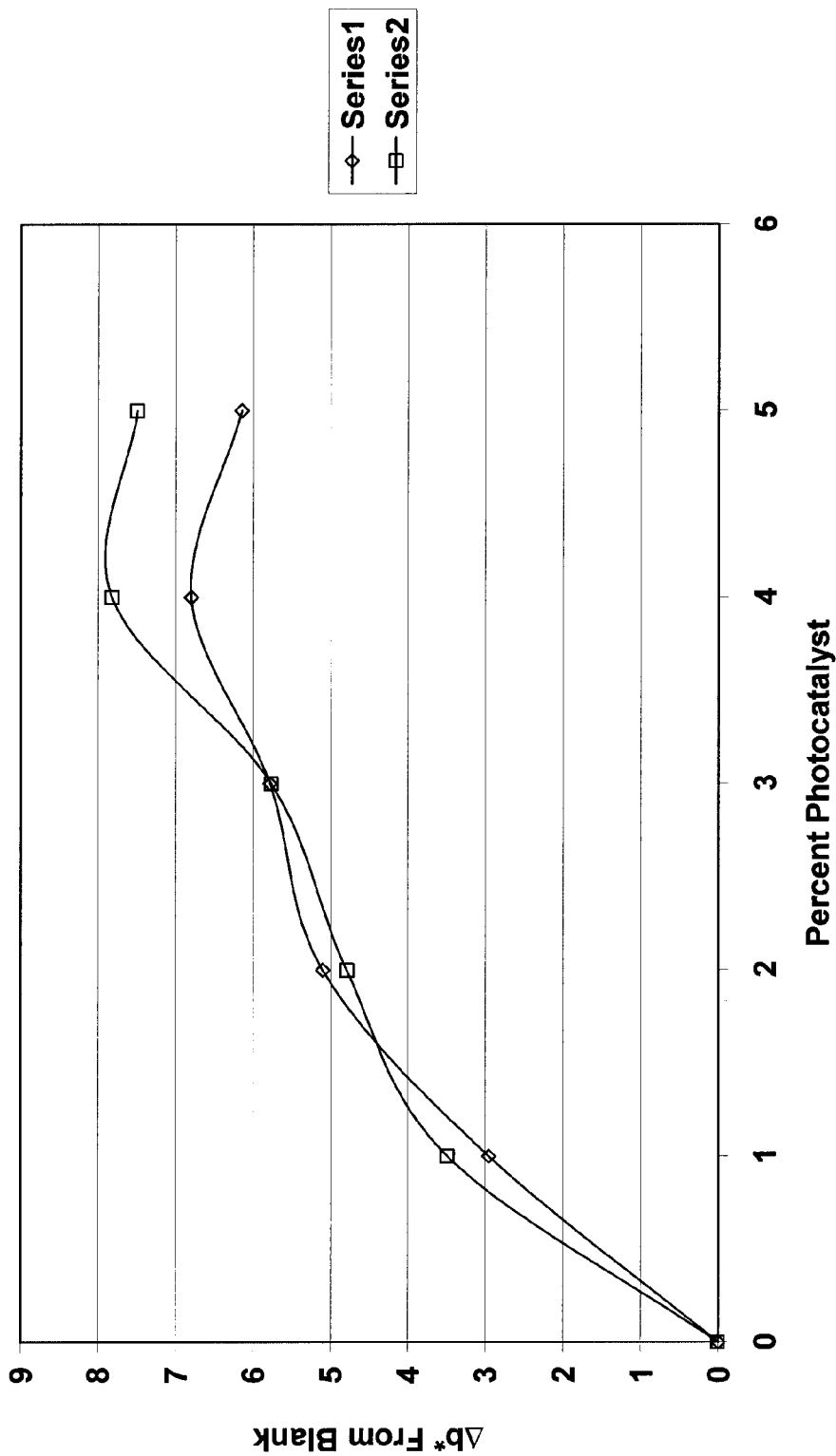
FIG. 9 shows the change in b* as a factor of photocatalyst level, which indicative of the self-cleaning ability of photocatalytic coatings comprising epoxy siloxane binder.

A paint was prepared at 20% PVC with varying amounts of photocatalyst and dyed using methyl red. The coatings were then exposed to UV light and the change in b* value measured. The results in FIG. 9 show the change in b* value attributable to the photocatalyst having subtracted the change in b* value for the blank coating. The two sets of results are for duplicate.

Example 5

Effect of Different $TiO_2$ Grades

Figure 10:
FIG. 10 shows the durability of photocatalytic coatings comprising epoxy siloxane binder and two types of pigmentary $TiO_2$.

The effect of the two different pigmentary titanium dioxide samples (Tiona® 595 or T595 and Tiona® 696 or T696) can be seen in FIG. 10 as the total percentage weight lost by each of the two grades after the full exposure time and for the different levels of photocatalyst. Tiona® 595 is a high performance, multipurpose rutile $TiO_2$ pigment which has been surface coated with $Al_2O_3$ and $ZrO_2$. It is recommended for interior and exterior water and solvent-based paints. Tiona 696 is a superdurable rutile $TiO_2$ pigment which has been surface coated with $SiO_2$.

The results show that the weight loss of the T696 sample was generally lower although the difference between the two pigments was small when there was no photocatalyst present. FIG. 10 shows that coating comprising both T595 and T696 pigments exhibited similar durability with catalyst levels of 1% to 6%.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. An organic solvent based composition for forming a self-cleaning, de-polluting single coating comprising:
    (i) photocatalytic titanium dioxide;
    (ii) a binder comprising an epoxy-functional silicon compound and an amino-functional silicon compound;
    (iii) one or more pigments; and
    (iv) an alkaline extender that is capable of neutralizing acidic species produced from degradation of $NO_x$ compounds;
    wherein the total pigment volume concentration of the organic solvent based composition is about 5% to about 70% by volume of the dry coating, and wherein the organic solvent based composition is substantially free of water, and wherein the organic solvent based composition is capable of effective application to a substrate as a single coating.

2. The composition of claim 1, wherein the amino-functional silicon compound is an amino silane.

3. The composition of claim 1, wherein the epoxy-functional silicon compound is an epoxy siloxane polymer.

4. The composition of claim 1, wherein the epoxy-functional silicon compound is an epoxy silane.

5. The composition of claim 1, wherein the epoxy-functional silicon compound comprises one or more terminal epoxy groups.

6. The composition of claim 1, further comprising a polysiloxane polymer or a silane compound.

7. The composition of claim 1, wherein the pigment is titanium dioxide.

8. The composition of claim 1, wherein the photocatalytic titanium dioxide is greater than about 95% in the anatase crystalline form.

9. The composition of claim 1, wherein the total pigment volume concentration is about 10% to about 50%.

10. The composition of claim 1, wherein the total pigment volume concentration is about 10% to about 40%.

11. The composition of claim 1, wherein the total pigment volume concentration is about 15% to about 35%.

12. The composition of claim 1, wherein the total pigment volume concentration is about 15% to about 30%.

13. The composition of claim 1, wherein the total pigment volume concentration is about 20% to about 35%.

14. The composition of claim 1, wherein the total pigment volume concentration is about 20% to about 30%.

15. The composition of claim 1, wherein the composition comprises about 1% to about 10% photocatalytic titanium dioxide by volume.

16. The composition of claim 1, wherein the composition comprises about 1% to about 5% photocatalytic titanium dioxide by volume.

17. The composition of claim 1, wherein the composition comprises about 1% to about 3% photocatalytic titanium dioxide by volume.

18. The composition of claim 1, wherein the composition comprises about 1% to about 5% photocatalytic titanium dioxide by volume and wherein the total pigment volume of the composition is about 10% to about 40%.

19. The composition of claim 1, wherein the composition comprises about 1% to about 5% photocatalytic titanium dioxide by volume and wherein the total pigment volume of the composition is about 20% to about 35%.

20. The composition of claim 1, wherein the alkaline extender is calcium carbonate.

\* \* \* \* \*

UNITED STATES PATENT AND TRADEMARK OFFICE
CERTIFICATE OF CORRECTION

| | | |
|---|---|---|
| PATENT NO. | : 8,475,581 B2 | Page 1 of 1 |
| APPLICATION NO. | : 13/034280 | |
| DATED | : July 2, 2013 | |
| INVENTOR(S) | : John Stratton et al. | |

It is certified that error appears in the above-identified patent and that said Letters Patent is hereby corrected as shown below:

On the Title Page Under Item (75) Inventors: After "John Stratton," delete "Cleethorpes" and replace with -- Lincolnshire --

In the Specifications:

Column 16, line 2: After ". The" insert -- % --

Signed and Sealed this
Third Day of September, 2013

Teresa Stanek Rea
*Acting Director of the United States Patent and Trademark Office*